(12) United States Patent
Thum (10) Patent No.: US 12,193,586 B2
(45) Date of Patent: Jan. 14, 2025

(54) MODULAR MANTEL HOOK APPARATUS

(71) Applicant: James W. Thum, El Dorado Hills, CA (US)

(72) Inventor: James W. Thum, El Dorado Hills, CA (US)

(*) Notice: Subject to any disclaimer, the term of this patent is extended or adjusted under 35 U.S.C. 154(b) by 0 days.

(21) Appl. No.: 18/370,090

(22) Filed: Sep. 19, 2023

(65) Prior Publication Data

US 2024/0090694 A1    Mar. 21, 2024

Related U.S. Application Data

(60) Provisional application No. 63/407,867, filed on Sep. 19, 2022.

(51) Int. Cl.
*A47G 33/00* (2006.01)
*F16M 13/02* (2006.01)

(52) U.S. Cl.
CPC ........... *A47G 33/00* (2013.01); *F16M 13/022* (2013.01)

(58) Field of Classification Search
CPC .... A47F 5/0838; A47F 5/0846; A47F 5/0853; A47G 1/1686; A47G 25/06; A47G 25/0607; A47G 25/0635; A47G 25/0678; A47G 25/44; A47G 29/08; A47G 33/00; A61G 12/005; B25H 3/04; B60P 7/0815; B61D 45/001; B64D 11/0696; F16M 11/041; F16M 13/022
USPC ........... 211/162; 248/220.31, 221.11, 222.11
See application file for complete search history.

(56) References Cited

U.S. PATENT DOCUMENTS

| | | | | |
|---|---|---|---|---|
| 1,800,386 A * | 4/1931 | Hoffman | ............... | A47F 5/0846 248/307 |
| 2,688,504 A * | 9/1954 | Parker | .................. | B61D 45/001 403/80 |
| 4,602,756 A * | 7/1986 | Chatfield | ............. | F16M 11/045 403/80 |
| 4,826,022 A * | 5/1989 | Duarte | .................. | A47F 5/0846 248/222.12 |
| 5,975,822 A * | 11/1999 | Ruff | .................... | B64D 11/0696 411/85 |
| 7,156,593 B1 * | 1/2007 | Saward | .................. | B60P 7/0815 410/104 |
| 10,676,196 B2 * | 6/2020 | Pacheco | ............. | B64D 11/0619 |
| 11,547,516 B2 * | 1/2023 | Schaub | .................. | A61B 50/31 |
| 2002/0144962 A1 * | 10/2002 | Dettorre | ............... | A63C 11/028 211/94.01 |
| 2003/0095846 A1 * | 5/2003 | Breckel | ................ | B61D 45/001 410/104 |

(Continued)

FOREIGN PATENT DOCUMENTS

EP    1108608 A1 *   6/2001   ............ B60P 7/0815
EP    2933140 A2 *  10/2015   ............ B60P 7/0815

*Primary Examiner* — Joshua E Rodden
(74) *Attorney, Agent, or Firm* — Dale J. Ream (57) ABSTRACT

A modular hook mounting apparatus for hanging ornamental objects from a fireplace mantel includes a track or rail member that defines a plurality of socket openings including an insertion socket sized to receive both lower and upper portions of a hook assembly and a remainder of sockets sized to receive only an upper portion of a hook assembly. Each hook assembly is spring-loaded so as to be slidably movable along a channel defined by the track member before being locked in place. Each hook assembly includes a C-shaped or J-shaped fastener capable of receiving and securing a holiday ornament.

19 Claims, 8 Drawing Sheets

(56) References Cited

U.S. PATENT DOCUMENTS

2014/0374564 A1* 12/2014 Schroeder ............ B60P 7/0815
  248/503

* cited by examiner

MODULAR MANTEL HOOK APPARATUS

REFERENCE TO RELATED APPLICATIONS

This application claims the priority of provisional patent application 63/407,867 filed Sep. 19, 2022 entitled Modular Mantel Hook apparatus which is incorporated in its entirety herein by reference.

BACKGROUND OF THE INVENTION

This invention relates generally to mantel hook systems and, more particularly, to a modular mantel hook apparatus that includes laterally-positionable, multi-directional rail hook members.

Traditionally, a mantel, also known as a fireplace mantel or mantelpiece, frames the opening of a fireplace and often covers part of the chimney chute. Also traditionally, large stockings are hung from the mantle above a fireplace and may be filled with fruit, presents, knickknacks, or other gifts during the Christmas season. Each stocking may include the name of a child, grandchild, or any selected individual who may be identified to receive the enclosed gifts. Unfortunately, it is often not possible to securely attach each stocking to a front side wall or bottom of a mantel.

Various hooks or hook systems have been proposed in the art for securing holiday socks or ornaments to a mantel. Although presumably effective for their intended purposes, the existing devices and proposals do not provide a rail system that enables multiple hook members to be laterally-positioned and capable of either side or downward configurations.

Therefore, it would be desirable to have a modular mantel hook apparatus that includes a length adjustable rail member that may be coupled to a mantel and having a plurality of sockets configured to receive a plurality of spring-loaded hook members that are each laterally positionable in selected sockets, respectively. Further, it would be desirable to have a modular mantel hook apparatus capable of receiving hooks oriented in a downward direction and in a side or horizontal direction.

SUMMARY OF THE INVENTION

A modular hook mounting apparatus for hanging ornamental objects from a fireplace mantel according to the present invention includes a track or rail member that defines a plurality of socket openings including an insertion socket sized to receive both lower and upper portions of a hook assembly and a remainder of sockets sized to receive only an upper portion of a hook assembly. Each hook assembly is spring-loaded so as to be slidably movable along a channel defined by the track member before being locked in place.

Track units may be manufactured in various lengths, for instance, lengths of 2 feet, one foot, 6 inches, 3 inches, or the like. A respective hook may be inserted and slidably moved along the track to a desired octagonal opening. The rail itself is designed to be mounted upside down so that respective hooks hang down. Alternatively, the rail may be mounted sideways such that a horizontal hook would be used. Mounting screw holes may be spaced apart to accommodate mounting to wall studs, such as every 16 inches) or more frequently to allow a user to mount as may be convenient. Optionally, endcaps may be inserted at each end of the rail for nicer aesthetic purposes.

Hook members are designed to have a hollow top where a spring and cap are housed. The spring continuously pushes the hook in an upward direction until it locks into place at a complementary aperture. Each hook member may include a hook configured in the manner of a clip. For instance, the hook may have a C-shaped clip configuration, a J-shaped clip configuration, or other shape configurations as will be described later in more detail.

Therefore, a general object of this invention is to provide a modular mantel hook apparatus that may be mounted either to a side or rear wall of a mantel and which is configured to receive a plurality of spring-loaded hook assemblies.

Another object of this invention is to provide a modular mantel hook apparatus, as aforesaid, that includes a rail assembly defining the plurality of sockets along with at least one insertion socket for receiving the respective hook assembly and defining an interior channel along which respective hook assemblies may travel when respective springs are compressed, respectively.

Still another object of this invention is to provide a modular mantel hook apparatus, as aforesaid, in which each hook assembly includes a hook portion having either a C-shaped or J-shaped configuration.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an exploded view of the mantel mounting apparatus as in FIG. 1a;

FIG. 2a. is another perspective view of the mantel mounting apparatus as in FIG. 1a;

FIG. 2b is an isolated view on an enlarged scale taken from FIG. 2a;

FIG. 3a is another perspective view of the mantel mounting apparatus as in FIG. 1a;

FIG. 3b is an isolated view on an enlarged scale taken from FIG. 3a;

FIG. 4b is an isolated view on an enlarged scale taken from FIG. 4a;

FIG. 5b is an isolated view on an enlarged scale taken from FIG. 5a;

FIG. 6b is a sectional view taken along line 6b-6b of FIG. 6a; and

FIG. 7b is a sectional view taken along line 7b-7b of FIG. 7a;

DESCRIPTION OF THE PREFERRED EMBODIMENT

A modular hook mounting apparatus according to a preferred embodiment of the present invention will now be described with reference to FIG. 1a to 8b of the accompanying drawings. The modular hook mounting apparatus 10 includes track member 20 that defines a plurality of socket openings including an insertion socket 25 and a remainder of sockets 26, the mounting apparatus 10 including a plurality of spring-loaded hook assemblies 30.

Figure 1A:
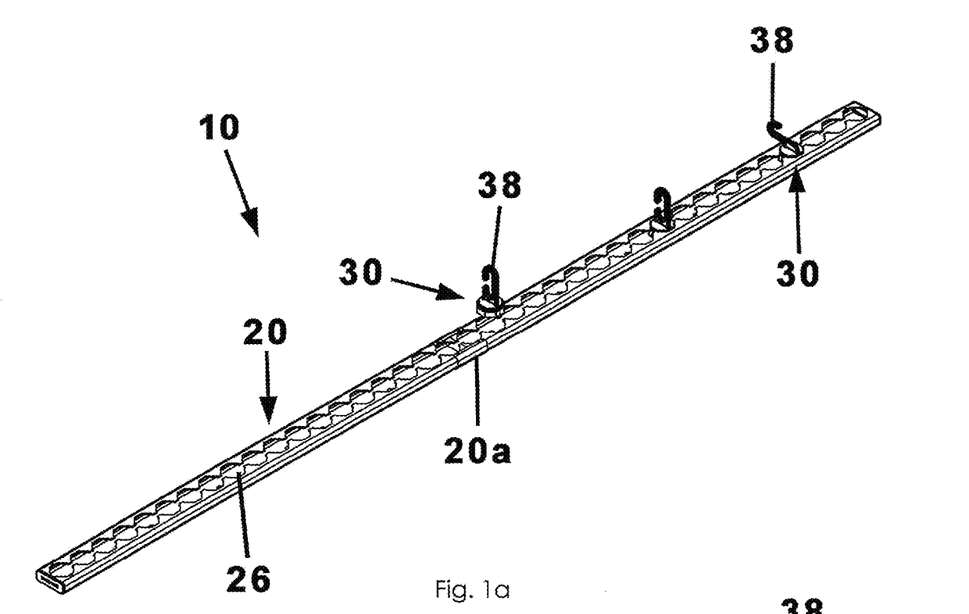
FIG. 1a is a perspective view of a modular mantel mounting apparatus according to a preferred embodiment of the present invention.
Figure 1B:
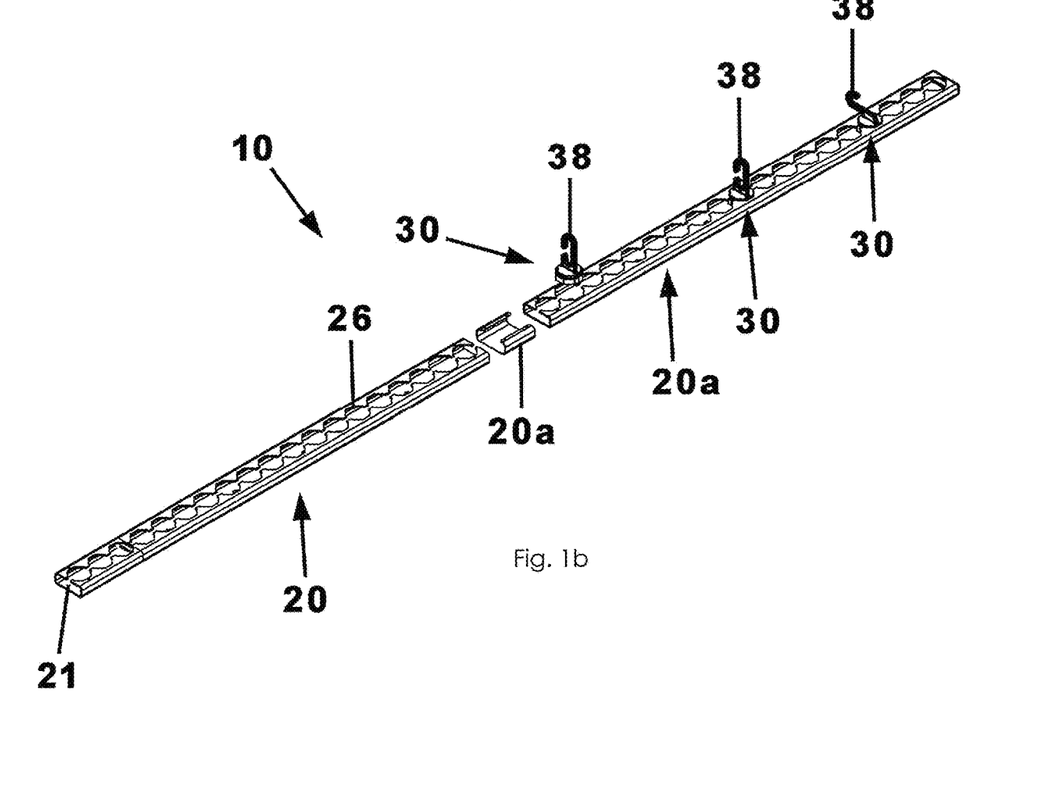

With specific reference to FIGS. 1a and 1b, the track member 20 of the modular hook mounting apparatus 10 may also be referred to as a rail member or just a rail. In an embodiment, the track member 20 may include a rear wall 21 having a flat or planar and elongate configuration as well as a front wall 22 that is opposite and parallel to the rear wall 21. The top and rear walls may be coupled together by laterally spaced apart side walls 23 such that the walls cooperate together to form an open interior area 24a. In an embodiment, the bottom, top, and side walls may have a unitary construction such as by molding or extrusion. Though not shown explicitly, the rear wall may be coupled to a side or bottom surface of a fireplace mantel using fasteners such as screws or the like. In an embodiment, the track member 20 may include a plurality of track units that may be coupled together in a modular end-to-end configuration, such as by using an interface member 20a and screws or the like. In other words, the track member 20 may be length adjustable. Open ends of each rail unit may be enclosed by insertion of end caps 29.

In a critical aspect, the front wall 22 may define a plurality of sockets laterally adjacent one another and each in communication via a channel 24 connecting them. More particularly, each socket may be referred to as an aperture and includes a shape configuration that is complementary to an upper portion of a hook assembly as will be described in greater detail later. For instance, a socket may have an octagonal configuration, i.e., 8 sides, through which only another object having a complementary configuration is able to pass.

Figures 2A, 2B:
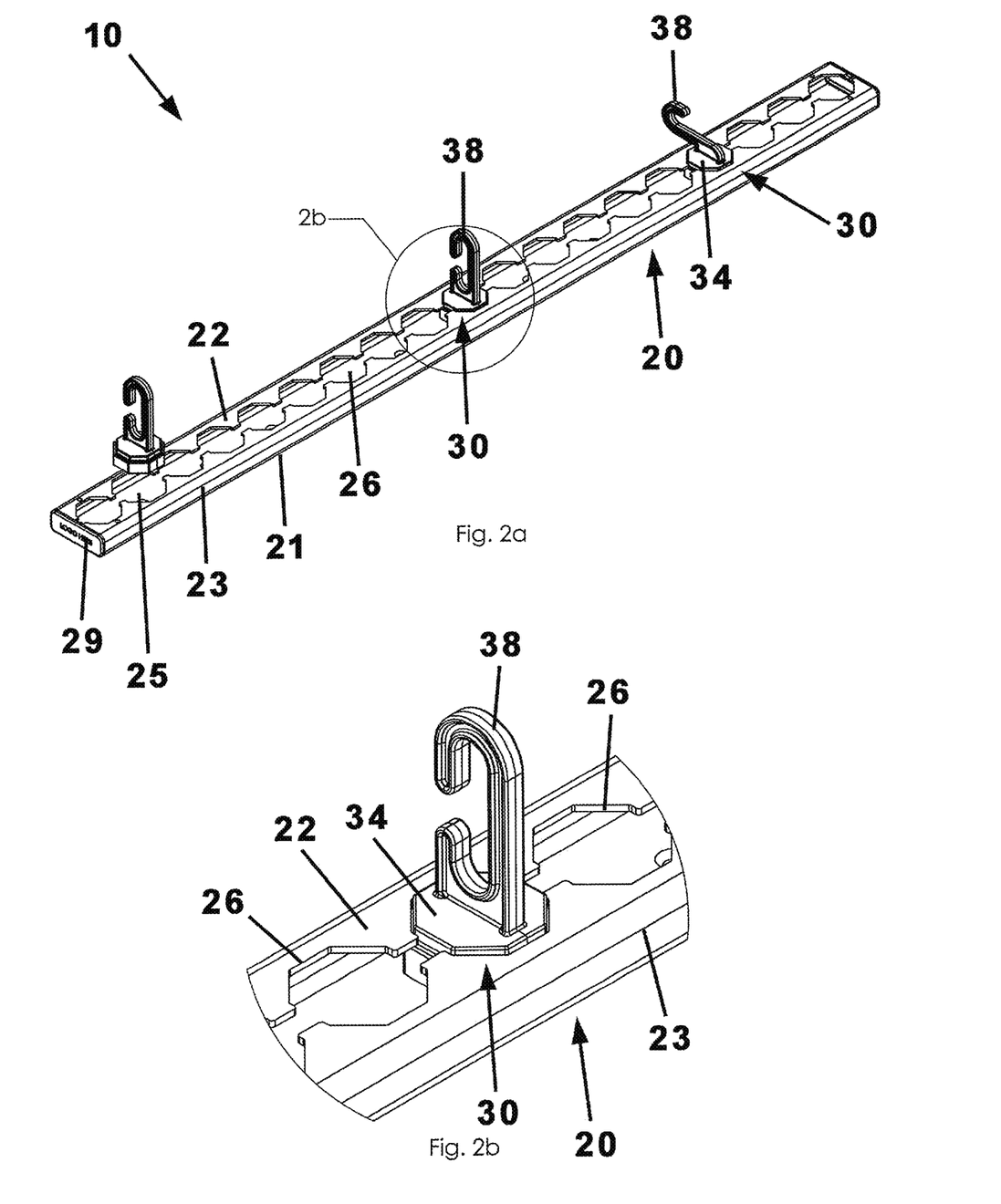
Figure 3A:
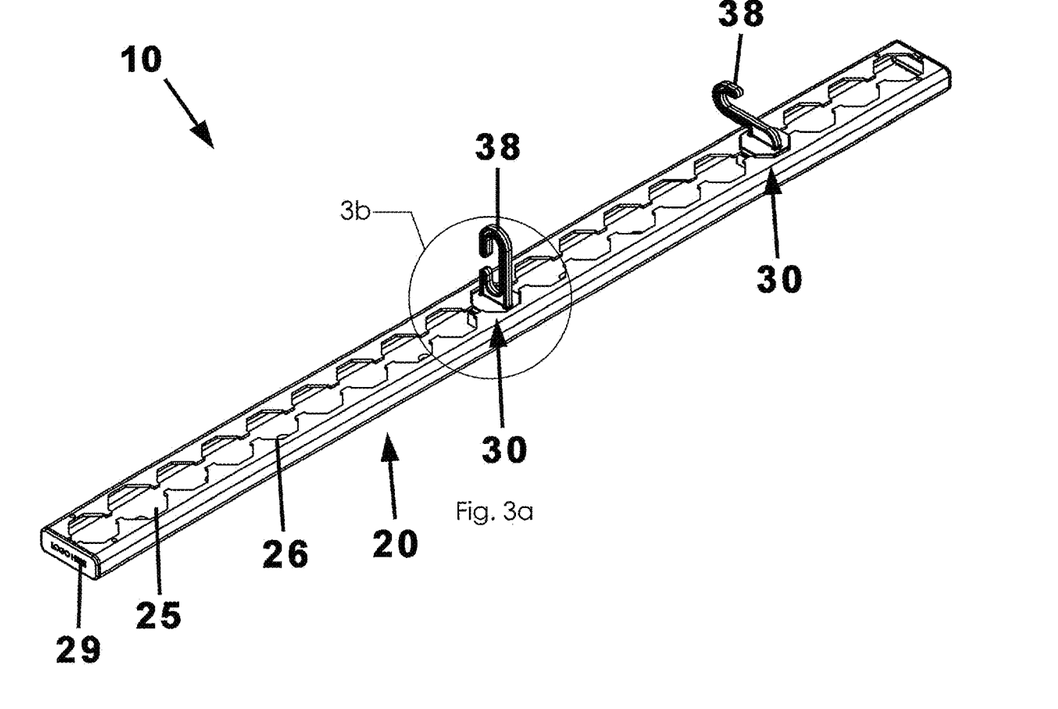
Figure 3B:
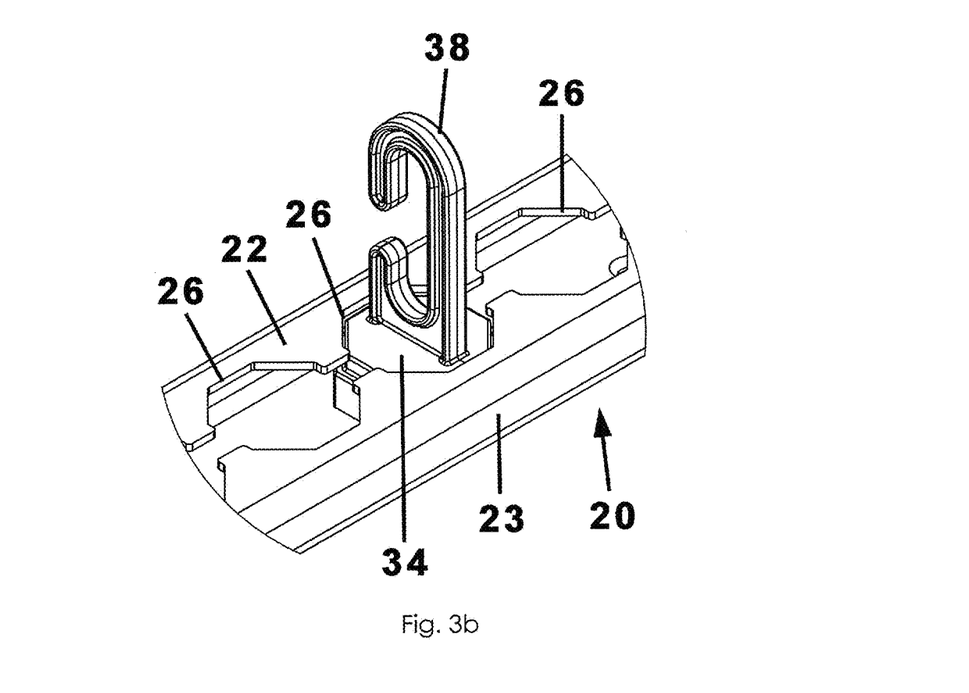
Figure 4A:
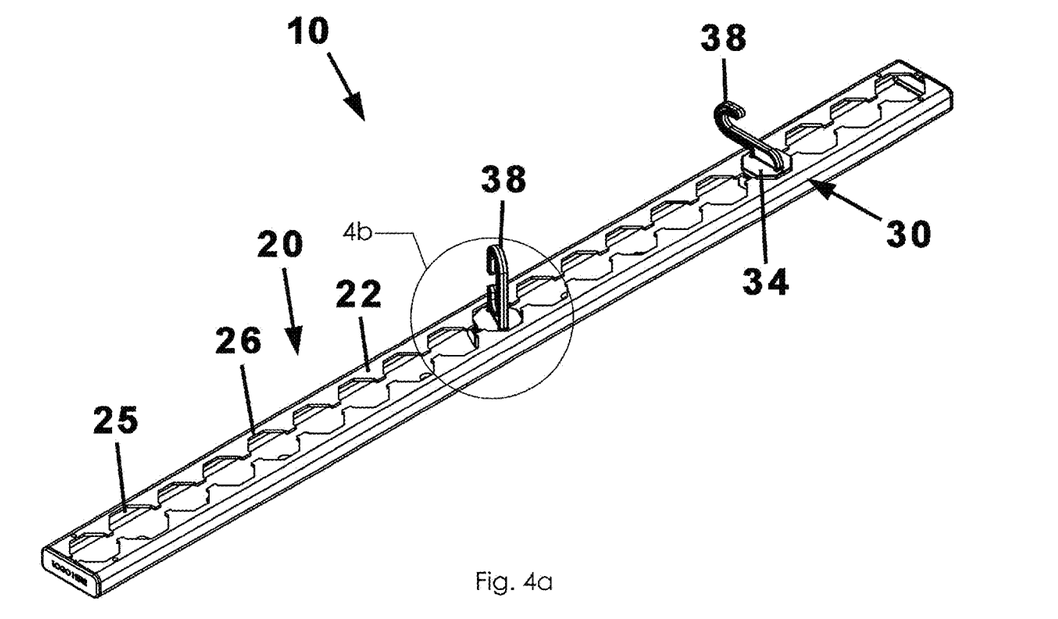
FIG. 4a is another perspective view of the mantel mounting apparatus according to the present invention.
Figure 4B:
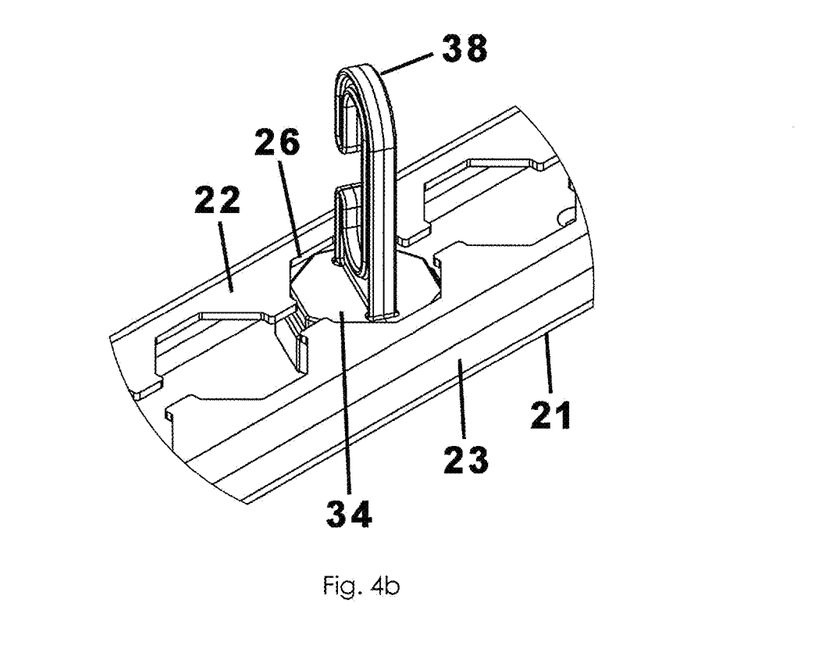
Figure 5A:
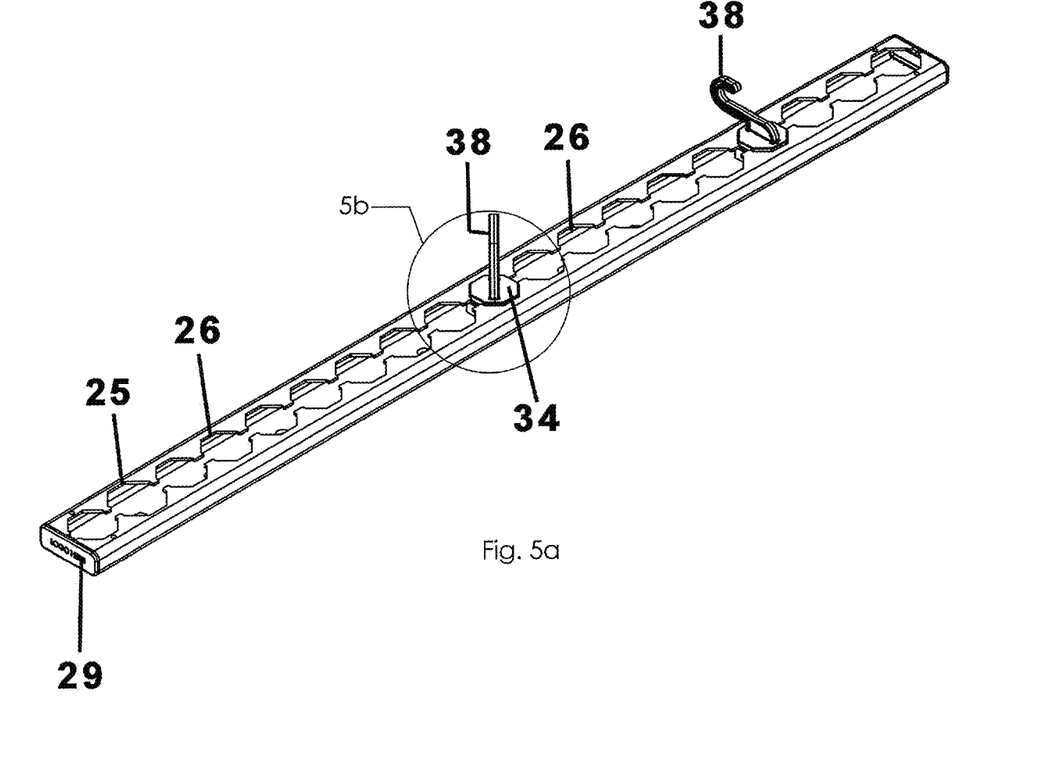
FIG. 5a is another perspective view of the mantel mounting apparatus according to the present invention.
Figure 5B:
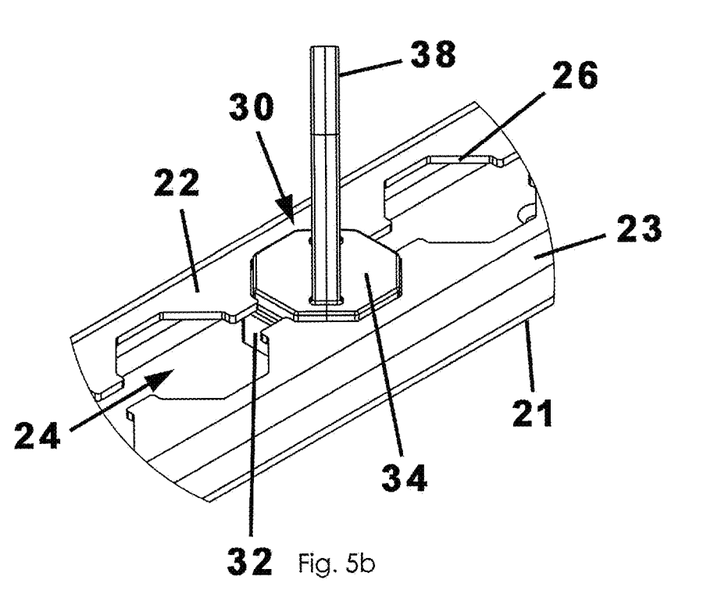

In a related aspect, the plurality of sockets may include an insertion socket 25 that defines an aperture that is larger, i.e., has a larger diameter than the uniform size of a remainder of the plurality of sockets 26 (FIG. 2a). It will be understood that the remainder of sockets each have an identical size and shape and will be referred to with reference number 26. As will become clear later, the insertion socket 25 is large enough to receive an upper portion 34 of a respective hook assembly 30 whereas the remainder of sockets 26 are intentionally too small to receive an upper portion 34 of the respective hook assembly 30.

Figure 6A:
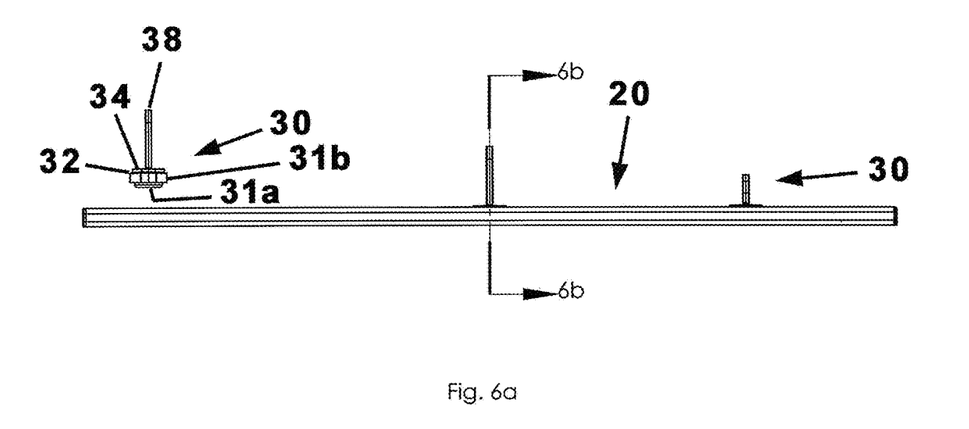
FIG. 6a is a side view of the mantel mounting apparatus according to the present invention.
Figure 6B:
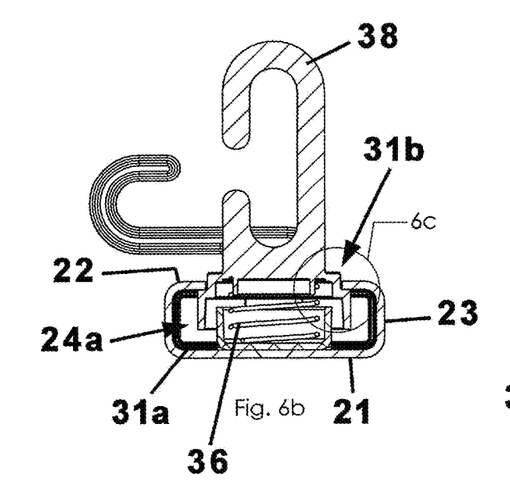
Figure 6C:
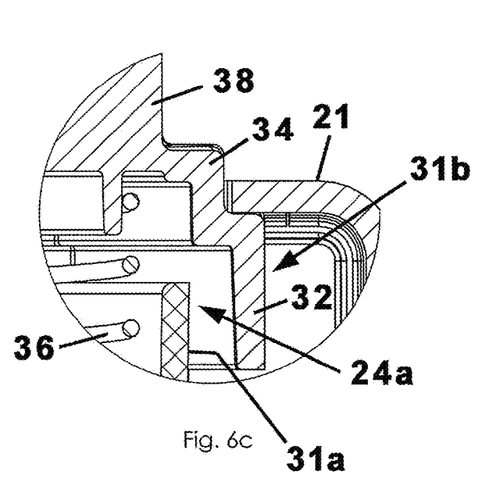
FIG. 6c is an isolated view on an enlarged scale taken from FIG. 6b.

The plurality of hook assemblies 30 will now be described in greater detail with reference to FIG. 6c. Each hook assembly 30 includes a stationary section 31a that may be nested inside (or surrounded by) a movable section 31b, the movable section 31b having a lower portion 32 and an upper portion 34 that may have a unitary construction. Each lower portion 32 has a diameter that is larger than an associated upper portion 34. In addition, each hook assembly 30 includes a compression spring 36. In an embodiment, a respective compression spring 36 may have a lower end coupled to or in contact with a respective stationary section 31a and may include an upper end coupled to or in communication with the respective lower portion 32 such that the spring 36 may be compressed when pressure is placed upon the upper portion 34; however, the spring 36 is naturally biased to extend upwardly or outwardly when the pressure is released. Stated another way, the respective movable section 31b is movable between a compressed configuration substantially inside the stationary section 31a (FIG. 7b) and an extended configuration substantially extending outside and away from the respective stationary section 31a (FIG. 6b).

It can now be seen that a respective lower portion 32 of a hook assembly 30 may be manually inserted by a user into the interior area 24a (i.e., into the channel of the rail 20 via the insertion socket 25). Next, the movable section 31b (which includes lower and upper portions 32, 34) may be depressed and manually compressed to the compressed configuration (FIG. 7b) such that the entire hook assembly 30 may be moved slidably along the channel 24 until a desired lateral position is located—at which time the upper portion 34 is allowed to pop up by normal decompression of the compression spring 36 so that the upper portion 34 extends through the aperture referred to as a respective remainder socket 26, as shown in FIG. 2b.

Figure 7A:
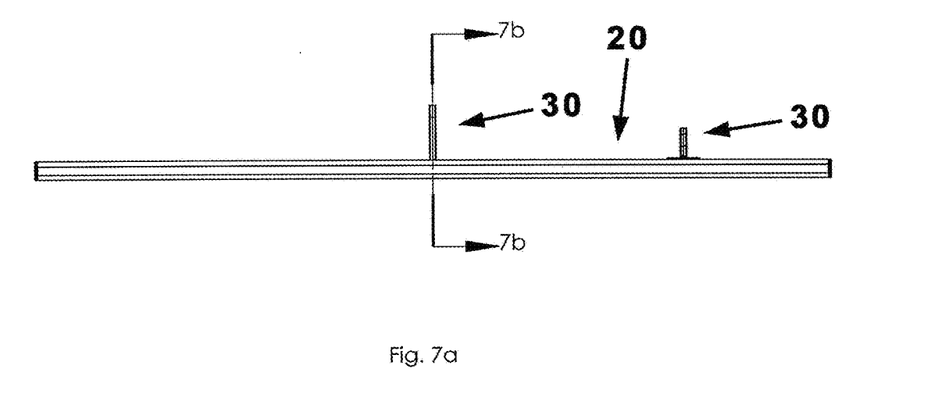
FIG. 7a is a side view of the mantel mounting apparatus according to the present invention.
Figure 7B:
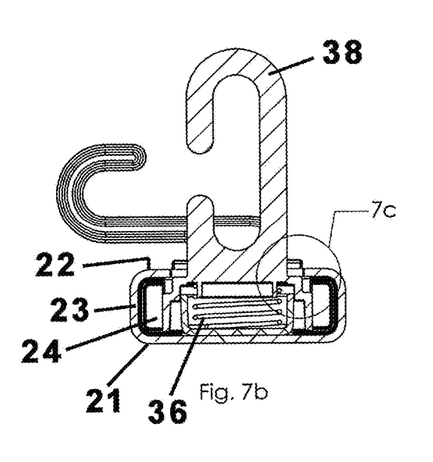
Figure 7C:
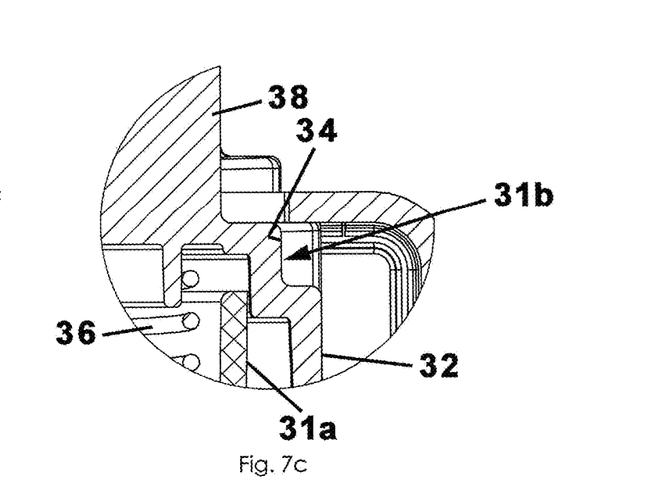
FIG. 7c is an isolated view on an enlarged scale taken from FIG. 7b.
Figure 8A:
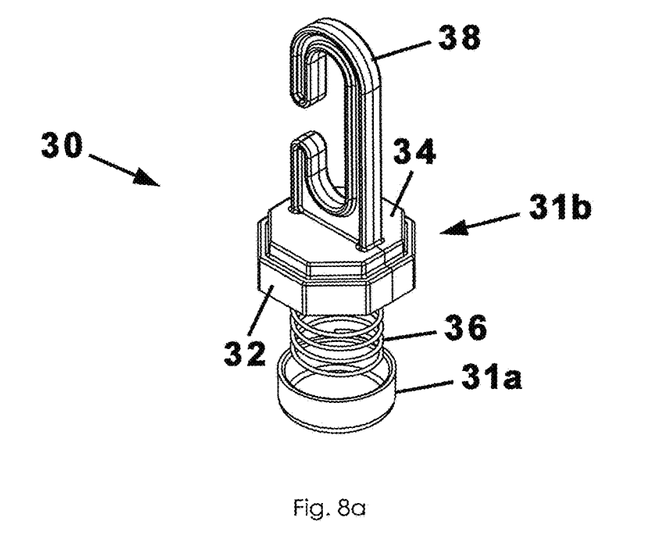
FIG. 8a is an exploded view of a hook assembly according to the present invention.
Figure 8B:
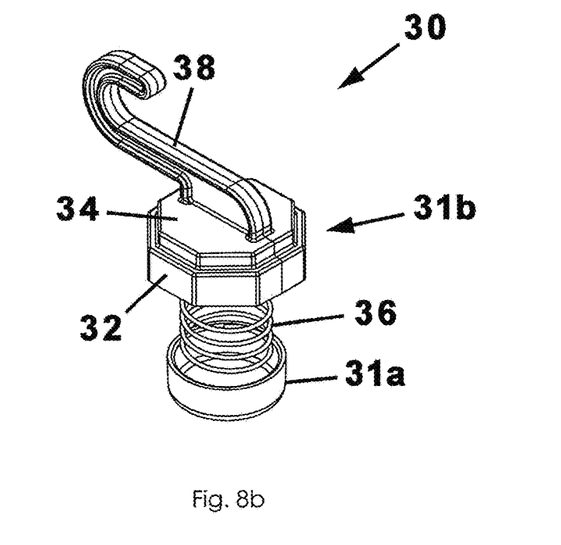
FIG. 8b is another exploded view of the hook assembly according to a variation of the present invention.

In another critical aspect, each of the plurality of hook assemblies 30 includes a fastener 38 having a first end mounted or coupled to a respective upper portion 34 and a second end that is opposite the first end and is displaced from the upper portion 34. As shown in the illustrations, the fastener 38 may be oriented within or parallel to an imaginary axis defined by the hook assembly 30 itself or, alternatively, may be oriented perpendicularly to the imaginary axis (both are seen in FIGS. 2a and 7b). In addition, the fastener 38 may have a generally C-shaped configuration or a J-shaped configuration. It is understood that a user may choose hook assemblies having appropriate or desirable hook configurations according to what object is to be hung therefrom. In other embodiments, the fastener 38 may include an eye-bolt configuration that is generally linear or may be a carabiner or other quick connect fastener. In addition, the fastener 38 may have a unitary construction with the upper portion 34 of the movable section 31b or may be glued, screwed, or sonically welded thereto.

It is understood that while certain forms of this invention have been illustrated and described, it is not limited thereto except insofar as such limitations are included in the following claims and allowable functional equivalents thereof.

The invention claimed is:

1. A modular hook mounting apparatus, comprising:
   a track member that includes a rear wall having an elongate and planar configuration and a front wall opposite and parallel to said rear wall that, together, define a channel;
   said front wall defining a plurality of sockets each having an octagonal configuration in communication with said channel, one of said plurality of sockets being an insertion socket having a diameter that is larger than a diameter of a remainder of said plurality of sockets;
   a plurality of hook assemblies each including a stationary section and a movable section initially nested about said stationary section, said movable section having a lower portion and an upper portion and the lower portion includes a diameter that is larger than a diameter of said upper portion;
   wherein each said hook assembly includes a compression spring having a lower end coupled to the stationary section and an upper end operatively coupled to the movable section such that said movable section is movable between a compressed configuration moved toward said stationary section when pressure is exerted on said upper portion and an extended configuration extending away from said stationary section when pressure on said upper portion is released;

wherein said plurality of hook assemblies each includes a fastener having a first end mounted to said upper portion and a second end displaced from said first end.

2. The modular hook mounting apparatus as in claim 1, wherein:
only said insertion socket is configured to receive a respective one of the lower portions of a respective one of the hook assemblies; and
each one of said remainder of said plurality of sockets is each configured to receive a respective one of the upper portions of a respective one of the hook assemblies in a nested configuration.

3. The modular hook mounting apparatus as in claim 2, wherein said remainder of said plurality of sockets each defines an aperture having a shape configuration for receiving said upper portion of a respective one of the hook assemblies.

4. The modular hook mounting apparatus as in claim 1, wherein said track member includes a plurality of track units selectively coupled together in a modular end-to-end configuration.

5. The modular hook mounting apparatus as in claim 1, wherein said fastener is a hook having one of a C-shaped or a J-shaped configuration.

6. The modular hook mounting apparatus as in claim 1, wherein said fastener is an I-bolt having a linear configuration.

7. The modular hook mounting apparatus as in claim 1, wherein said fastener is a carabiner.

8. The modular hook mounting apparatus as in claim 6, wherein said remainder of said plurality of sockets are laterally adjacent one another and in communication with one another such that the plurality of hook assemblies is each laterally movable along said channel when in said compressed configuration.

9. The modular hook mounting apparatus as in claim 1, wherein said compression spring, when unrestrained, is biased to urge said movable section toward said extended configuration.

10. The modular hook mounting apparatus as in claim 1, wherein said upper end is in communication with said movable section of the respective one of the hook assemblies.

11. A modular hook mounting apparatus, comprising:
a track member that includes a rear wall having an elongate and planar configuration and a front wall opposite and parallel to said rear wall that, together with a pair of laterally spaced apart side walls that extend between said front and rear walls, define a channel;
said front wall defining a plurality of sockets laterally adjacent one another there along, each having an octagonal configuration in communication with said channel, one of said plurality of sockets being an insertion socket having a diameter that is larger than a diameter of a remainder of said plurality of sockets;
a plurality of hook assemblies each including a stationary section and a movable section initially nested concentrically about said stationary section, said movable section having a lower portion and an upper portion and the lower portion having a diameter that is larger than a diameter of said upper portion;
wherein each said hook assembly includes a compression spring having a lower end coupled to the stationary section and an upper end operatively coupled to the movable section such that said movable section is slidably movable between a compressed configuration urged toward said stationary section when pressure is exerted on said upper portion and an extended configuration extending away from said stationary section when pressure on said upper portion is released;
wherein said plurality of hook assemblies each includes a fastener having a first end mounted to said upper portion and a second end displaced from said first end.

12. The modular hook mounting apparatus as in claim 11, wherein:
only said insertion socket is configured to receive a respective one of the lower portions of a respective one of the assemblies; and
each one of said remainder of said plurality of sockets is each configured to receive a respective one of the upper portions of a respective one of the hook assemblies in a nested configuration.

13. The modular hook mounting apparatus as in claim 11, wherein said track member includes a plurality of track units selectively coupled together in a modular end-to-end configuration.

14. The modular hook mounting apparatus as in claim 11, wherein said fastener is a hook having one of a C-shaped or a J-shaped configuration for selectively securing a holiday ornament.

15. The modular hook mounting apparatus as in claim 11, wherein said remainder of said plurality of sockets are laterally adjacent one another and in communication with one another such that the plurality of hook assemblies is each laterally movable along said channel when in said compressed configuration.

16. The modular hook mounting apparatus as in claim 11, wherein said compression spring, when unrestrained, is biased to urge said movable section toward said extended configuration.

17. The modular hook mounting apparatus as in claim 11, wherein said fastener is an I-bolt having a linear configuration.

18. The modular hook mounting apparatus as in claim 11, wherein said fastener is a carabiner.

19. A modular hook mounting apparatus, consisting of:
a track member that includes a rear wall having an elongate and planar configuration and a front wall opposite and parallel to said rear wall that, together with a pair of laterally spaced apart side walls that extend between said front and rear walls, define a channel;
said front wall defining a plurality of sockets laterally adjacent one another there along, each having an octagonal configuration in communication with said channel, one of said plurality of sockets being an insertion socket having a diameter that is larger than a diameter of a remainder of said plurality of sockets;
a plurality of hook assemblies each including a stationary section and a movable section initially nested concentrically about said stationary section, said movable section having a lower portion and an upper portion and the lower portion having a diameter that is larger than a diameter of said upper portion;
wherein each said hook assembly includes a compression spring having a lower end coupled to the stationary section and an upper end operatively coupled to the movable section such that said movable section is slidably movable between a compressed configuration urged toward said stationary section when pressure is exerted on said upper portion and an extended configuration extending away from said stationary section when pressure on said upper portion is released;

wherein:

only said insertion socket is configured to receive a respective one of the lower portions of a respective one of the assemblies; and each one of said remainder of said plurality of sockets is each configured to receive a respective one of the upper portions of a respective one of the hook assemblies in a nested configuration;

wherein said plurality of hook assemblies each includes a fastener having a first end mounted to said upper portion and a second end displaced from said first end, said fastener being a hook having one of a C-shaped or a J-shaped configuration for selectively securing a holiday ornament.

* * * * *